UNITED STATES PATENT OFFICE.

PETER H. RYMAL, OF CHICAGO, ILLINOIS.

IMPROVEMENT IN HORSE AND CATTLE MEDICINES.

Specification forming part of Letters Patent No. 194,727, dated August 28, 1877; application filed March 21, 1877.

*To all whom it may concern:*

Be it known that I, PETER H. RYMAL, of Chicago, in the county of Cook and State of Illinois, have invented certain new and useful Improvements in Horse and Cattle Food, of which the following is a specification:

This invention relates to an improved food for horses and cattle, its object being to prevent disease, to put and maintain the animals in a healthy condition, and to economize food.

A varied diet is necessary to all animals, and horses and cattle, in a natural state, instinctively seek the herbs and other food necessary to maintain their health, and when prevented from making these selections for themselves disease must sooner or later appear.

The object of my invention is to provide a substitute for these essentials to health, and, by a combination of certain herbs, seeds, and roots with certain nutritious grains or cereals reduced to meal, form an article of food for stall-fed animals which will take the place of the natural food which they are prevented from obtaining.

My invention consists of a compound composed of the following ingredients, in or about the proportions named, viz: Corn or maize-meal, fifty pounds; oil-cake meal, fifty pounds; flaxseed-meal, fifty pounds; fenugreek-seed, four pounds; ginger, three pounds; caraway-seed, three and a half pounds; hemlock-bark, three and a half pounds; sulphur, two and a half pounds; anise-seed, two and a half pounds; gentian-root, five pounds; salt, ten pounds; blood-root, one and a half pound; belladonna, one pound; locust-bean meal, five pounds; elecampane-root, three pounds.

The above ingredients which are not in the state of meal, are reduced to powder, and the whole is thoroughly mixed and combined, and put up in convenient packages or otherwise packed for sale.

In using the improved food a suitable quantity, usually about a table-spoonful to an ordinary feed, is mixed with the usual food, and given to the animal at the usual feeding-time, ordinarily about three times a day.

The above proportions of the ingredients I have found to answer well in practice; but I do not desire to limit myself to the precise proportions enumerated, as they may be modified, if desired, and still form a compound that may be beneficially used as a food.

By the use of my improved food the animal will be kept at all times in as healthy condition as in a state of nature, and will require less of the ordinary food than they would without the improved food, resulting in considerable economy to the stock-raiser, and others employing the food.

What I claim, and desire to secure by Letters Patent, is—

A composition consisting of corn or maize meal, oil-cake meal, flaxseed-meal, fenugreek-seed, ginger, caraway-seed, hemlock-bark, sulphur, anise-seed, gentian-root, salt, blood-root, belladonna, locust-bean meal, and elecampane-root, the whole combined and mixed gether in about the proportions and for the purposes herein set forth.

In testimony that I claim the foregoing I have hereunto set my hand in the presence of the subscribing witnesses.

PETER H. RYMAL.

Witnesses:
 JAMES L. NORRIS,
 JOS. L. COOMBS.